US009251356B2

(12) United States Patent  
Ogawa

(10) Patent No.: US 9,251,356 B2  
(45) Date of Patent: Feb. 2, 2016

(54) MODULE ENCRYPTION/DECRYPTION PROGRAM

(75) Inventor: Hideaki Ogawa, Kyoto (JP)

(73) Assignee: DNP Hyper Tech Co., Ltd. (JP)

( * ) Notice: Subject to any disclaimer, the term of this patent is extended or adjusted under 35 U.S.C. 154(b) by 127 days.

(21) Appl. No.: 14/346,012

(22) PCT Filed: Jun. 14, 2012

(86) PCT No.: PCT/JP2012/065246
§ 371 (c)(1),
(2), (4) Date: Mar. 20, 2014

(87) PCT Pub. No.: WO2013/042409
PCT Pub. Date: Mar. 28, 2013

(65) Prior Publication Data
US 2015/0006909 A1    Jan. 1, 2015

(30) Foreign Application Priority Data

Sep. 20, 2011  (JP) ................................ 2011-204370

(51) Int. Cl.
*G06F 21/60* (2013.01)
*G06F 21/14* (2013.01)
*G06F 21/00* (2013.01)
*G06F 21/12* (2013.01)

(52) U.S. Cl.
CPC ............ *G06F 21/602* (2013.01); *G06F 21/123* (2013.01); *G06F 21/14* (2013.01); *G06F 21/00* (2013.01); *G06F 21/121* (2013.01)

(58) Field of Classification Search
CPC ....... G06F 21/602; G06F 21/00; G06F 21/14; G06F 21/121; G06F 21/123
See application file for complete search history.

(56) References Cited

U.S. PATENT DOCUMENTS

| | | | |
|---|---|---|---|
| 7,752,141 B1* | 7/2010 | Ogg .................... | G06Q 20/382 705/60 |
| 2002/0178354 A1* | 11/2002 | Ogg .................... | G06Q 20/382 713/155 |
| 2004/0123122 A1 | 6/2004 | Asai et al. | |
| 2007/0118763 A1 | 5/2007 | Kamei | |
| 2011/0154051 A1* | 6/2011 | Larson .................... | G06F 21/54 713/189 |
| 2012/0331303 A1* | 12/2012 | Andersson .............. | G06F 21/56 713/189 |

FOREIGN PATENT DOCUMENTS

| JP | 2005-018725 A | 1/2005 |
|---|---|---|
| JP | 2005-050196 A | 2/2005 |
| JP | 2007-148575 A | 6/2007 |
| JP | 2010-217975 A | 9/2010 |
| JP | 2011-028506 A | 2/2011 |

* cited by examiner

*Primary Examiner* — Krisna Lim

(74) *Attorney, Agent, or Firm* — Harness, Dickey & Pierce, P.L.C.

(57) ABSTRACT

Even for encrypted programs, when all modules are decrypted all at once at the time of execution, it is possible to analyze codes stored within a storage area. Therefore, a program execution and decryption method that prevents easy analysis via reverse-engineering is required. In order to solve the aforementioned problem, this invention provides a program complex that allows execution of modules while modules are being decrypted upon execution, even if a program has been started. Thereby, modules cannot be easily analyzed and program tamper resistance can be improved.

5 Claims, 14 Drawing Sheets

MODULE ENCRYPTION/DECRYPTION PROGRAM

CROSS-REFERENCE TO RELATED APPLICATIONS

This application is a U.S. National Stage Application of International Application No. PCT/JP2012/065246 filed on Jun. 14, 2012, and published in Japanese as WO 2013/042409 A1 on Mar. 28, 2013. This application claims priority to Japanese Application No. 2011-204370 filed Sep. 20, 2011. The disclosures of the above applications are incorporated herein by reference.

BACKGROUND OF THE INVENTION

1. Field of the Invention

The present invention relates to a technology that allows improvement of tamper resistance for software.

2. Description of the Related Art

In some cases, it is not desirable for the content of certain software, such as software containing an authentication algorithm, to be publicly known. However, in such cases, which include cases involving executable format software, there is fear that the nature of the software authentication algorithm or the source code could be brought to light through disassembly or debugging. In regards to the technology disclosed in Unexamined Japanese Patent Application Publication No. JP 2011-28506, complexity of conditional branch instructions in source codes makes branch condition analysis difficult. Such technology allows enhancement of code obfuscation in order to avoid the aforementioned threat. That is to say, even if disassembly or the like becomes possible and if source code analysis takes place, source code obfuscation will cause time and effort to be expended for analysis. In this way, it becomes possible to improve software tamper resistance.

SUMMARY OF THE INVENTION

Problems to be Solved by the Invention

Even if source code obfuscation is enhanced, the resulting executable format codes are written in an unencrypted data format. Thus, analysis can take place successfully with the expenditure of a certain amount of time, which is problematic. Therefore, it is possible to conceive of a method for encrypting an executable format code and decrypting the same at the time of execution. An executable format file stored in storage area is encrypted with the use of such method, which makes it almost impossible to analyze the relevant file. However, decryption processing can be analyzed by a debugger or the like even if encrypted codes are safe, which is problematic. For example, with the use of a method in which all codes are decrypted and execution takes place, such codes are encrypted prior to execution. Thus, it is almost impossible to analyze such codes. However, with the use of a method in which all codes are decrypted at the time of execution, images can be analyzed when the decrypted programs are loaded into the memory. In this way, it becomes possible to access the relevant content.

In such case, it is necessary to realize a method of executing programs in a way that does not allow encrypted modules to be easily analyzed.

Means for Solving the Problems

In order to solve the above deficiencies, first, the present invention provides a program complex that comprises a plurality of modules. In relation to the program complex, prior to execution, at least one module is retained in the form of encrypted data. At the time of execution, module(s) executed prior to the encrypted module(s) undertake decryption, and the decrypted module(s) are executed.

Specifically, a first aspect of the invention provides a program complex composed of a module assembly comprising a program body in which at least one module is encrypted at the time of non-execution, and in case that the next module to be executed is encrypted, a decryption program for causing a computer to execute processing for decryption via an arithmetic logic unit at a time prior to completion of the module currently being executed.

Moreover, based on the first program complex, after calling up the next module to be executed, a second aspect of the invention provides a program complex that deletes such module from a storage area.

More specifically, the program complex according to this aspect of the invention further comprises a deletion program for causing a computer to delete a calling source module that has called up the next module following commencement of execution of the next module from a storage medium for an arithmetic logic unit.

Furthermore, based on the first program complex, after calling up the next module to be executed, a third aspect of the invention provides a program complex that re-encrypts such module.

More specifically, the program complex according to this aspect of the invention further comprises a re-encryption program for causing a computer to re-encrypt a calling source module that has called up the next module following commencement of execution of the next module from a storage medium for an arithmetic logic unit.

Advantageous Effect of the Invention

According to the first aspect of the present invention, which has the configuration described above, it is possible to retain modules in the form of encrypted data prior to execution and to decrypt the modules which have been encrypted at the time of execution immediately prior to execution, thereby allowing execution of the modules to take place. When the aforementioned aspect of the present invention is implemented, it is possible to maintain the modules that are desirable to be concealed until just before execution in a state of encryption. Thus, even when programs are analyzed via debuggers or the like, it takes more time and effort to implement such analysis than in cases in which all modules are simultaneously readable. This allows program tamper resistance to be improved.

Additionally, according to the second aspect of the present invention, it is possible to delete the modules that are desirable to be concealed from storage medium immediately following execution thereof. Thereby, the unencrypted data modules remaining in the storage area following execution can be deleted, and it becomes impossible to analyze the content thereof. With the implementation of the aforementioned aspect, operations are possible in which unencrypted data modules exist in storage area only at the time of execution. This allows program tamper resistance to be improved.

Moreover, immediately following execution of the modules that are desirable to be concealed, the third aspect of the present invention enables re-encryption thereof.

Thereby, the unencrypted data modules remaining in the storage area following execution can be encrypted, and it becomes impossible to analyze the content thereof. With the implementation of the aforementioned aspect, operations are possible in which unencrypted data modules exist in storage area only at the time of execution. This allows program tamper resistance to be improved.

DETAILED DESCRIPTION OF THE INVENTION

Embodiments of the present invention will be described hereinafter with reference to the drawings. The present invention is not limited to the above embodiments and may be embodied in various forms without exceeding the scope thereof. A first embodiment will mainly describe the first, second, and third aspects of the current disclosure. A second embodiment will mainly describe the fourth aspect of the current disclosure. A third embodiment will mainly describe the fifth aspect of the current disclosure.

First Embodiment

Outline

FIG. 1 is a conceptual diagram explicating an example of a program complex of a first embodiment. As shown in this figure, in relation to the program complex, which is defined as program A, there exist "p" number of modules between address X and address Y. Modules 2 to p are encrypted. The program is implemented from module 1 to module p in order. A hierarchical execution method in which module 1 calls up module 2 and module 2 calls up module 3 is implemented.

The module to be protected is designated "module p." Prior to execution, analyzers do not know that module p exists at address Y. Unless execution and analysis of module p–1 are first completed, module p cannot be analyzed. In contrast, in a method for encryption in which all modules are first decrypted at the time of execution, following decryption, it is possible to overlook the entire flow of programs. Thus, the fact that module p should be protected can be identified at an early stage, and analysis of module p becomes possible.

In FIG. 2, the information presented in FIG. 1 is further simplified, and FIG. 2 provides an explanation of the running of program A. As shown in this figure, in an initial state (0201), all modules other than module 1 are encrypted. When execution commences, module 1 is executed. Prior to completion of module 1, module 1 decrypts module 2. Sequentially, execution takes place while the next module is being decrypted. Execution takes place while module p, which is to be protected, is being decrypted, and the relevant procedures are completed (0202).

As described above, the program complex of the first embodiment enables decrypting of the next module to be executed immediately preceding execution and completion of an early module at the time of the execution of the program. This makes it possible for a module code to be readable only when execution takes place. Thus, in a case in which it is intended to analyze module p, which is to be protected, as shown in FIG. 2, it is impossible to analyze module p directly, and it is necessary to execute the modules sequentially in order to do so. Thus, in a case in which the program is analyzed via a debugger, etc., it takes remarkably more time for analysis than in cases in which all functions are readable simultaneously. Moreover, the process up to function p, which is a target of protection, has been concealed through encryption. Thus, it is impossible for analyzers to grasp the overall picture of the relevant program.

Functional Configuration of First Embodiment

FIG. 3 is a diagram explicating an example of a functional block for the program complex of the first embodiment. As described in this figure, a "program complex" (0300) of the first embodiment has a "program body" (0301), a "module assembly" (0302), and a "decryption program" (0303).

The "program body" (0301) is composed of the elements in a module assembly. There are a plurality of modules, including at least one module to be protected. The module to be protected is encrypted.

The "module assembly" (0302) comprises a plurality of modules. The term "modules" here includes functions, subroutines, methods, and the like. When the next module to be executed has been encrypted, the relevant module calls up the decryption program (0303), decrypts the next module at a time prior to completion of such module, and executes the next module. In FIG. 3, the module following module 2 is the module to be protected. Thus, module 2 calls up the decryption program (0303) at a time prior to completion of module 2 and decrypts module 3. Execution then takes place.

The term "execution" used with reference to a module means loading a module into the storage area of memory or the like, transmitting relevant data to an arithmetic logic unit, receiving the results therefrom, and thereby, changing the internal system state. The term "arithmetic logic unit" refers to operable devices, such as a CPU, an MPU, a GPU, and the like. A device into which such "arithmetic logic unit" is incorporated and in the storage area of which operation results can be stored is a "computer."

Encrypted modules are not necessarily limited to modules to be protected. In order to deceive analyzers, modules other than modules to be protected are encrypted. Thereby, the path leading up to the functions to be protected can be concealed. In this way, it can be expected that the aforementioned procedure will increase the time and effort necessary for analysis and improve tamper resistance.

FIG. 4 is a diagram for explaining the "time prior to completion of modules." The horizontal axis in this figure is the time axis, representing the times at which modules are executed. Module 1 is an unencrypted data module. In order to decrypt module 2 as an encryption module prior to completion, such module calls up a decryption program, and in conjunction therewith, it executes module 2. Modules 2 executes module 3 prior to completion. Execution of module 4 commences at a time prior to completion of modules 2 and 3. In such case, module 2 may call up a decryption program, decrypt module 4, and execute the same. Module 3 may call up a decryption program, decrypt module 4 prior to completion, and execute the same. Module 5 has been executed following completion of module 4. Thus, module 2 calls up a decryption program at a time prior to completion of module 2 and thereby, decryption and execution of module 5 take place.

As described above, the "next module to be executed" is not necessarily limited to modules to be executed immediately after the current module, as can be observed in the relationship between module 2 and module 4, and that between module 2 and module 5. As explained above, a decryption program is called and execution instructions for the next module are incorporated in an appropriate location within a module. Thereby, the relevant module can be executed at the required time and appropriate program can be run.

The "decryption program" (0303) decrypts the next module. More specifically, address information is received in storage area of the module after the module being executed. Decryption takes place based on such information. In regard to a decryption program, as shown in FIG. 2, a separate decryption program may separately exist, may be called up from a module, or may be directly embedded in each module. Additionally, a plurality of decryption programs may exist and may make themselves responsive to a plurality of types of encryption schemes. In such case, it is possible to include in a module that is being executed execution instructions for a decryption program based on an encryption scheme suitable for the next module.

Progression of Process of First Embodiment

FIG. 5 is a flow chart showing an example of the progression of the process of the program complex of the first embodiment. First of all, it is judged whether or not the next module after a given module determines has been encrypted (step S0501). In case that encryption has taken place, decryption processing will be executed (step S0502). In case that encryption has not taken place, step S0502 will be skipped. Thereafter, the next module is executed (step S0503). It is determined whether or not program is completed (step S0504). If the program is not completed, the procedure returns to step S0501. If the program is completed, the program will stop running.

Hardware Configuration of First Embodiment

FIG. 6 is a schematic diagram showing an example of the configuration of the program complex when the aforementioned functional constituent features are implemented by hardware. Operations of hardware configuration units in relation to application switch processing are explained with reference to FIG. 6. As described in this figure, the program complex of the first embodiment comprises a "CPU (central processing unit)" which executes arithmetic processing (0601), a "volatile memory" (0602), and a "nonvolatile memory" (0603). Additionally, the program complex includes an "input/output IF" (0604) connected to a mouse, keyboard, display, and the like, which accept operational input by users. The aforementioned items are mutually connected through a data communication path, such as a "system bus" (0605), and transmission, receipt, and processing of information take place.

Moreover, in order to cause the "CPU" (0601) to execute programs that implement various processes, the "volatile memory" (0601) reads out such programs from the "nonvolatile memory" (0602) and simultaneously provides working areas as working space for such programs.

Program A starts with a command from the input/output IF (0604). If so, program A is loaded into the volatile memory (0602) from the nonvolatile memory (0603). Processing of program A is executed via the CPU (0601). The program A is composed of n modules and the decryption program. The modules are executed by the CPU (0601) in order. When it has been judged that the next module has been encrypted, the decryption program is executed by the CPU (0601) via the module that is currently being executed. The encrypted module is decoded, the resultant is an unencrypted data module, and the relevant code is recorded in the volatile memory (0602). The recorded code is executed by the CPU (0601).

Brief Description of Effects of First Embodiment

As described above, the program complex of the first embodiment allows reading of the encrypted module to be executed, decrypting of the same based on an original module, and execution of the same. Thereby, the modules can be executed in a hierarchical manner, and it is possible to maintain the module to be protected until just before execution in an encrypted state. In this way, it will take more time and effort to implement analysis, in contrast to cases in which all modules are decrypted all at once. Thus, program tamper resistance will be improved.

Second Embodiment

Outline of Second Embodiment

FIG. 7 is a conceptual diagram for explaining an example of application of a program complex of a second embodiment. As shown in this figure, at the time of commencement of program execution (0801), modules other than module 1 have been encrypted. Prior to completion of execution of module 1, module 2 to be executed subsequently is decrypted by a decryption program. Following completion of module 1, module 1 is deleted from the storage area (0802).

As explained above, the program complex of the second embodiment is a switching device that allows a module that has called up a module to be executed subsequently to be deleted from the storage area when the module to be executed subsequently commences. Thereby, at the time of completion of program execution, it becomes impossible to analyze codes of modules remaining in the storage area. Therefore, program tamper resistance will be improved.

Functional Configuration of Second Embodiment

FIG. 8 is a diagram showing an example of a functional block of the program complex of the second embodiment. As described above, a "program complex" (0800) of the second embodiment comprises a "program body" (0801), a "module assembly" (0802), and a "decryption program" (0803). In addition, the constituent features have been already described in the first embodiment. Thus, explanations of the same are omitted. The program complex of the second embodiment is characterized in that the "program complex" (0800) newly includes a "deletion program" (0804).

The "deletion program" (0804) executes processing that causes a computer to execute processing for deletion from a storage medium for an arithmetic logic unit of a calling source module that has called up the next module following commencement of execution of the next module. With reference to FIG. 7, module 2 or module 3 detects that operations of module 2 have been completed. The address of the storage area of module 2 is obtained from either module 2 or module 3. Based on the acquired address, the deletion program executes deletion of module 2.

Progression of Process of Second Embodiment

FIG. 9 is a flow chart showing an example of progression of process of the program complex of the second embodiment. First, it is judged whether or not the next module is encrypted (step S0901). In case that encryption has taken place, decryption processing will be executed (step S0902). In case that encryption has not taken place, step S0902 will be skipped. Thereafter, execution of the next module commences (step S0903). Subsequently, the next module deletes the calling source module (step S0904). Thereafter, it is judged whether or not the program has been completed (step S0905). If such program has not been completed, the process returns to step S0901. If the program is completed, the program will stop running.

Hardware Configuration

FIG. 10 is a schematic diagram showing an example of the configuration of the program complex when the aforementioned functional constituent features are implemented by hardware. Operations of hardware configuration units in relation to application switch processing are explained with reference to FIG. 10. As described in this figure, the program complex of the second embodiment comprises a "CPU (central processing unit)" (1001) which executes arithmetic processing, a "volatile memory" (1002), and a "nonvolatile memory" (1003). Additionally, the program complex includes an "input/output IF" (1004) connected to a mouse, keyboard, display, and the like, which accept operational input by users. The aforementioned items are mutually connected through a data communication path, such as a "system bus" (1005), and transmission, receipt, and processing of information take place.

Moreover, in order to cause the "CPU" (1001) to execute programs that implement various processes, the "volatile memory" (1002) reads out such programs from the "nonvolatile memory" (1003) and simultaneously provides working areas as working space for such programs.

Program A starts with a command from the input/output IF (1004). If so, program A is loaded into the volatile memory (1002) from the nonvolatile memory (1003). Processing of program A is executed via the CPU (1001). The program A is composed of n modules and the decryption program. The modules are executed by the CPU (1001) in order. When it has been judged that the next module has been encrypted, the decryption program is executed by the CPU (1001) via the module that is currently being executed. The encrypted module is decoded, the resultant is an unencrypted data module, and the relevant code is recorded in the volatile memory (1002). The recorded code is executed by the CPU (1001).

Upon execution of the unencrypted data module, program A executes the deletion program via the CPU (1001). The deletion program deletes the first module that has been executed in program A from the volatile memory (1002).

Brief Description of Effects of Second Embodiment

As described above, deletion of the modules following execution enables deletion of unencrypted data codes remaining in a storage area following execution. Thereby, it becomes impossible to analyze codes of modules following execution. Therefore, it is possible to execute a program complex with high tamper resistance.

Third Embodiment

Outline of Third Embodiment

FIG. 11 is a conceptual diagram for explaining an example of application of a program complex of a third embodiment. As shown in this figure, at the time of commencement of program execution (1101), modules other than module 1 have been encrypted. Prior to completion of execution of module 1, module 2 to be executed subsequently is decrypted by a decryption program. Following completion of module 1, module 1 will be encrypted again (1102).

As explained above, the program complex of the third embodiment enables re-encryption of a calling source module that has called up the next module at the time of execution of such next module. Thereby, it becomes impossible to analyze codes of a module remaining in a storage area following execution of such module or the program body. Therefore, tamper resistance of the program complex will be improved.

Functional Configuration of Third Embodiment

FIG. 12 is a diagram explicating an example of a functional block for the program complex of the third embodiment. As described in this figure, a "program complex" (1200) of the third embodiment has a "program body" (1201), a "module assembly" (1202), and a "decryption program" (1203). In addition, the constituent features have been already described in the first embodiment. Thus, explanations of the same are omitted. The program complex of the third embodiment is characterized in that the "program complex" (1200) newly includes a "re-encryption program" (1204).

The "re-encryption program" (1204) executes processing that causes a computer to execute processing for re-encryption of a calling source module following commencement of execution of the next module in a storage medium for an arithmetic logic unit. More specifically, following commencement of execution of the next module, the re-encryption program acquires address information of the calling source module (i.e., module 2) from the calling source module or a module that is being executed (i.e., module 3). The module that is being executed executes the re-encryption program and encrypts the calling source module.

Progression of Process of Third Embodiment

FIG. 13 is a flow chart showing an example of progression of process of the program complex of the third embodiment. First, it is judged whether or not the next module is encrypted (step S1301). In case that encryption has taken place, decryption processing will be executed (step S1302). In case that encryption has not taken place, step S1302 will be skipped. Thereafter, execution of the next module commences (step S1303). Subsequently, the next module re-encrypts the calling source module (step S1304). Thereafter, it is judged whether or not the program has been completed (step S1305). If such program has not been completed, the process returns to step S1301. If the program is completed, the program will stop running.

Hardware Configuration

FIG. 14 is a schematic diagram showing an example of the configuration of the program complex when the aforementioned functional constituent features are implemented by hardware. Operations of hardware configuration units in relation to application switch processing are explained with reference to FIG. 14. As described in this figure, the program complex of the third embodiment comprises a "CPU (central processing unit)" which executes arithmetic processing (1401), a "volatile memory" (1402), and a "nonvolatile memory" (1403). Additionally, the program complex includes an "input/output IF" (1404) connected to a mouse, keyboard, display, and the like, which accept operational input by users. The aforementioned items are mutually connected through a data communication path, such as a "system bus" (1405), and transmission, receipt, and processing of information take place.

Moreover, in order to cause the "CPU" (1401) to execute programs that implement various processes, the "volatile memory" (1402) reads out such programs from the "nonvolatile memory" (1403) and simultaneously provides working areas as working space for such programs.

Program A starts with a command from the input/output IF (1404). If so, program A is loaded into the volatile memory (1402) from the nonvolatile memory (1403). Processing of program A is executed via the CPU (1401). The program A is composed of n modules and the decryption program. The modules are executed by the CPU (1401) in order. When it has been judged that the next module has been encrypted, the decryption program is executed by the CPU (1401) via the module that is currently being executed. The encrypted module is decoded, the resultant is an unencrypted data module, and the relevant code is recorded in the volatile memory (1402). The recorded code is executed by the CPU (1401).

Upon execution of the unencrypted data module, program A executes the re-encryption program via the CPU (1401). The re-encryption program re-encrypts the first module that has been executed in program A and stores such module in the volatile memory or in the nonvolatile memory.

Brief Description of Effects of Third Embodiment

As described above, the program complex of the third embodiment enables re-encryption of unencrypted data codes remaining in a storage area following execution. Thereby, it becomes impossible to analyze codes of modules following execution. Therefore, it is possible to execute a program complex with high tamper resistance.

Figure 1:
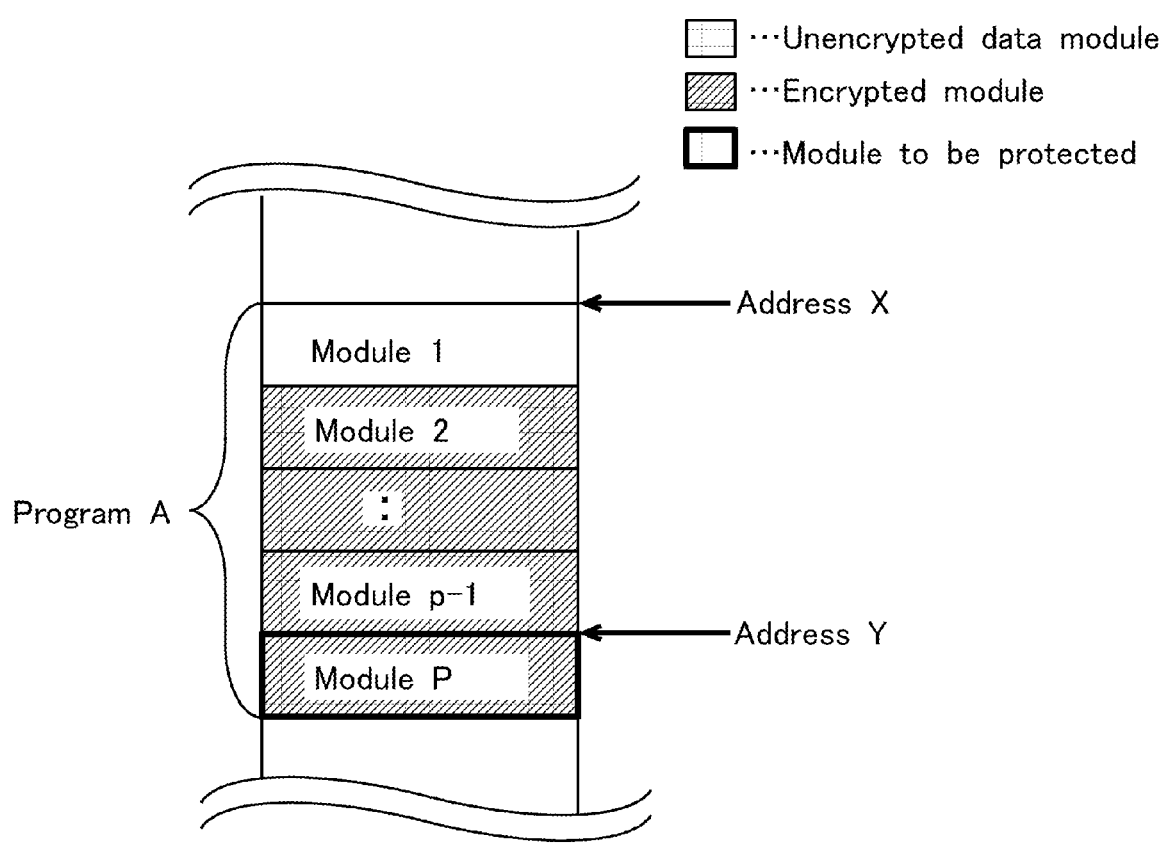
FIG. 1 is a diagram explicating an outline of processes of a program complex of a first embodiment.
Figure 2:
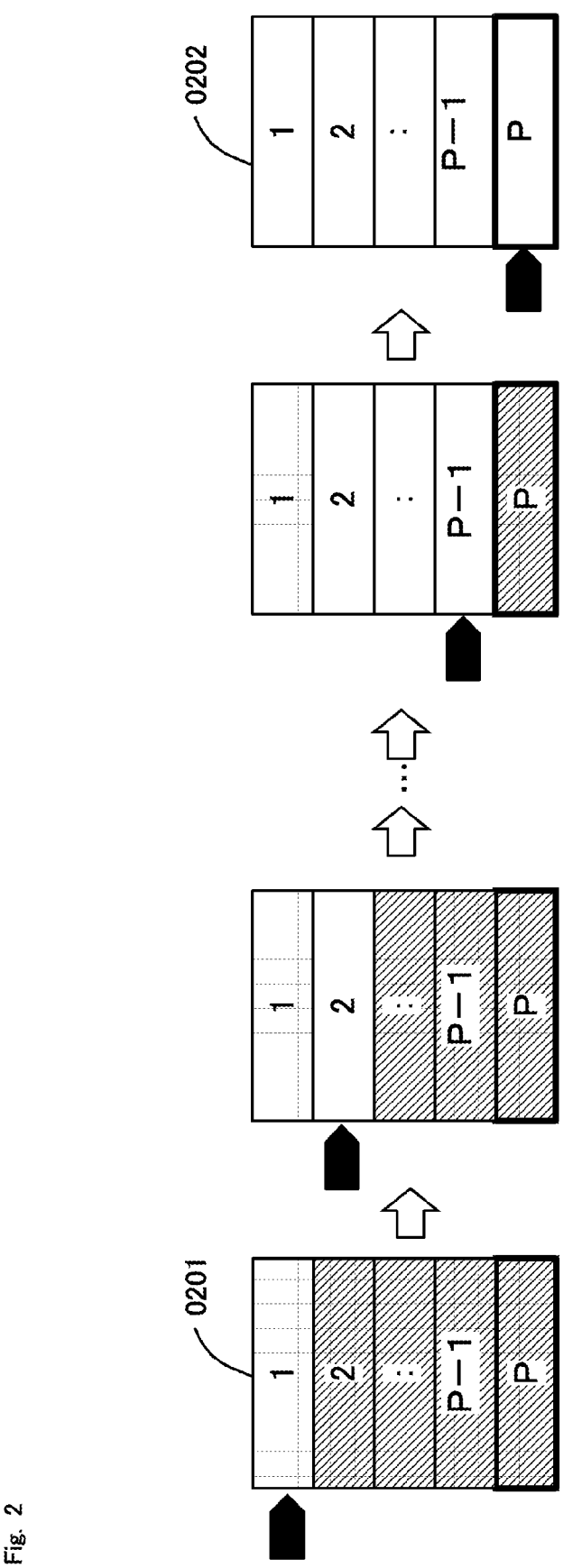
FIG. 2 is a diagram explicating an example of processes of the program complex of the first embodiment.
Figure 3:
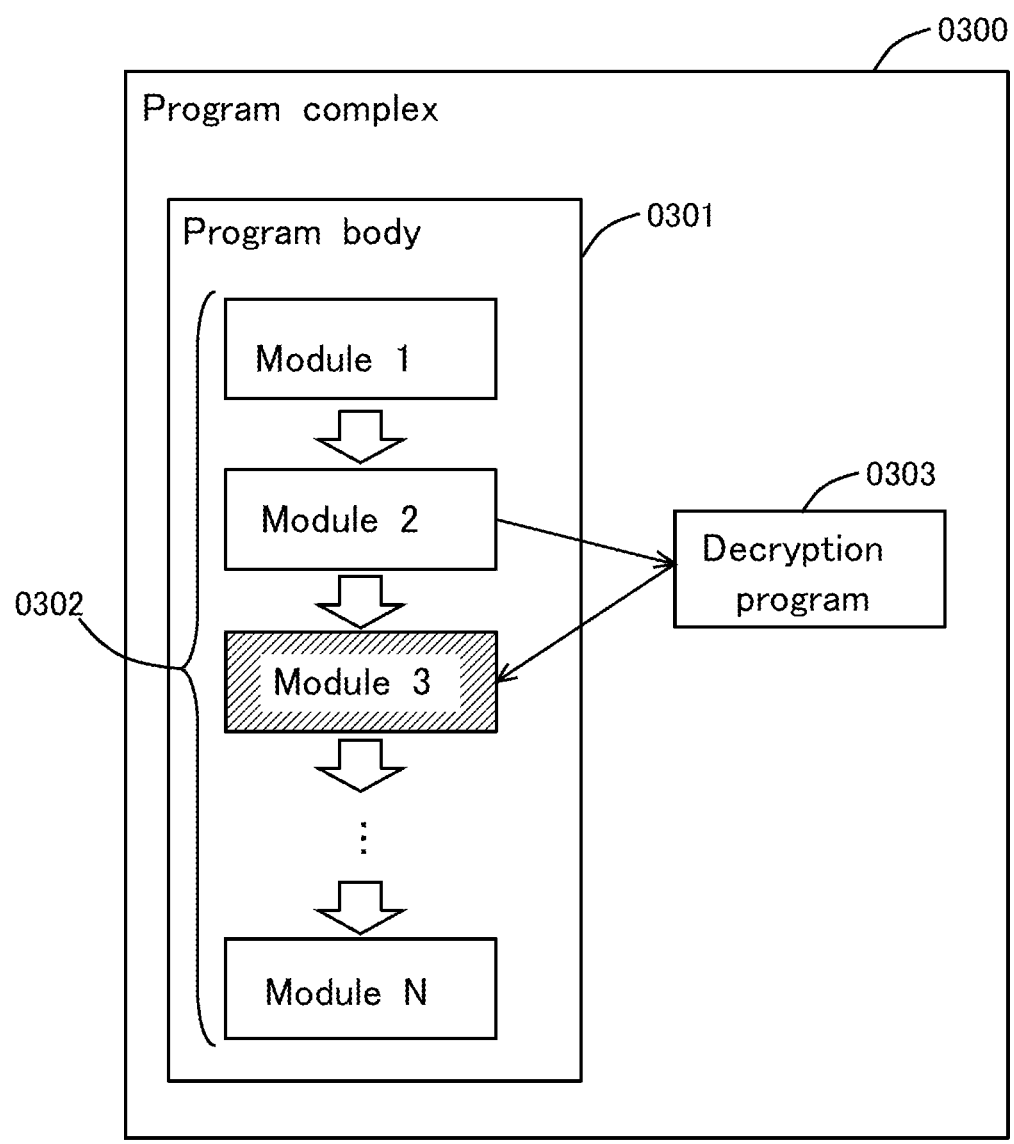
FIG. 3 is a diagram explicating an example of a functional block for the program complex of the first embodiment.
Figure 4:
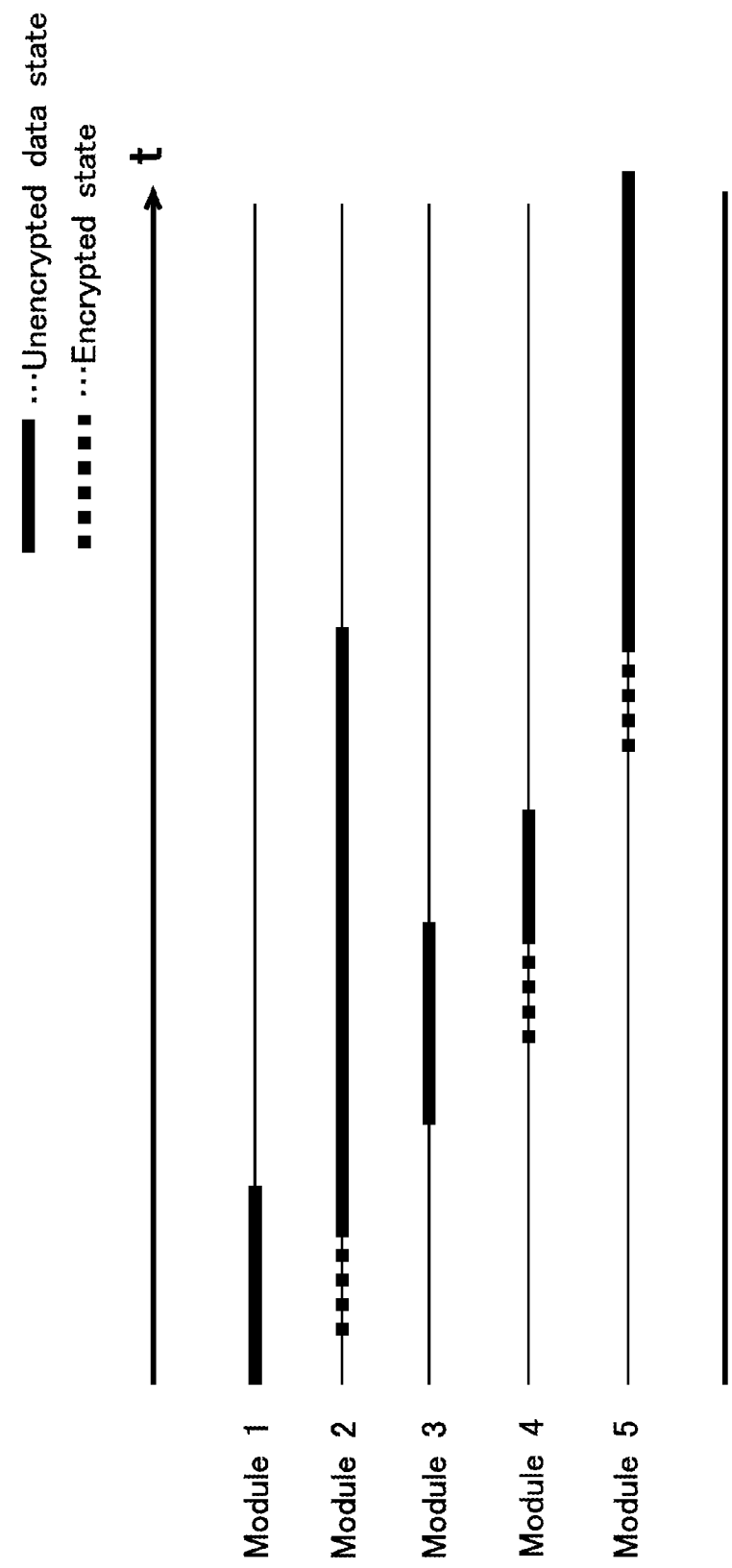
FIG. 4 is a timing chart for explaining an example of processes of the program complex of the first embodiment.
Figure 5:
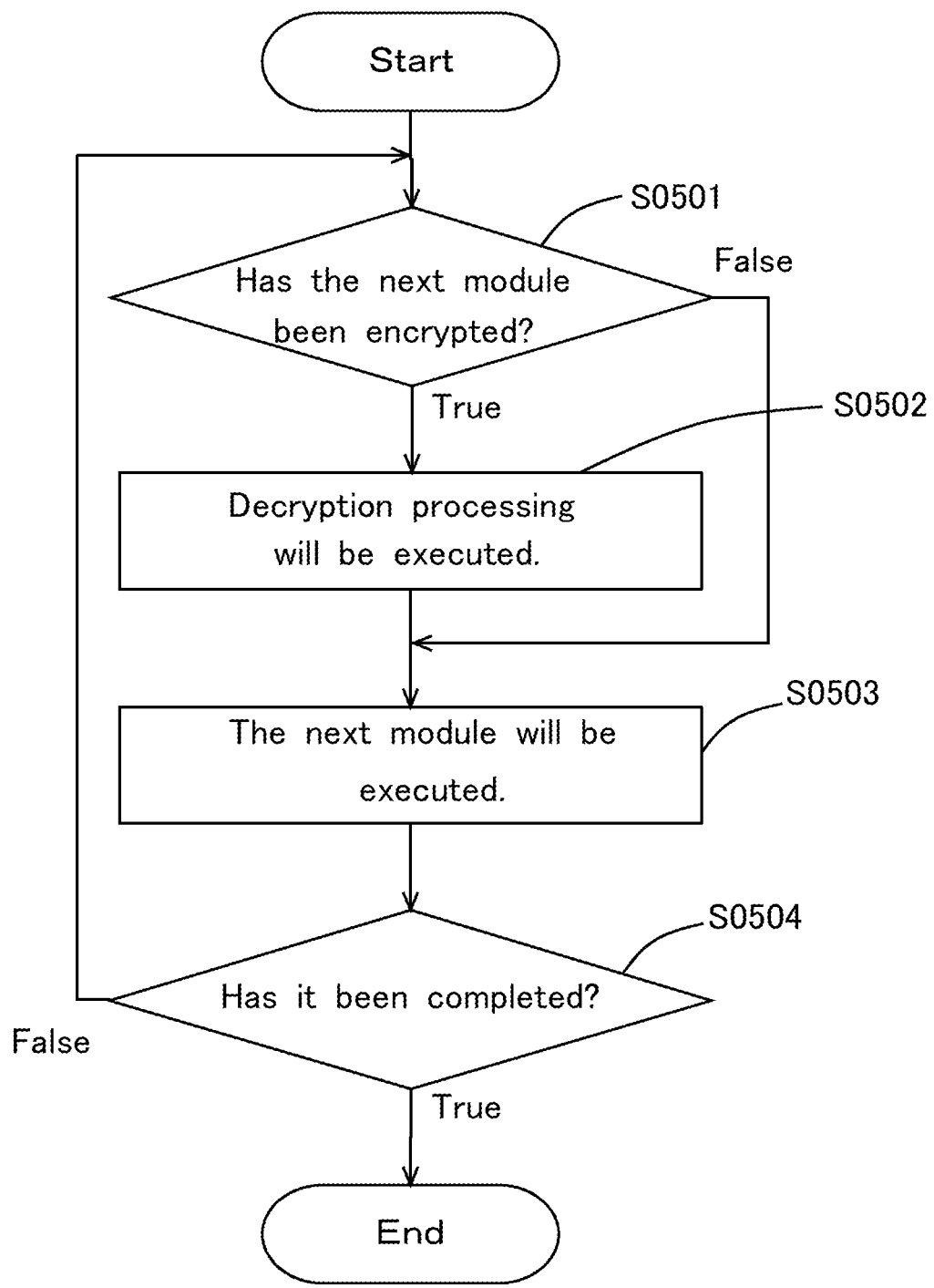
FIG. 5 is a flow chart showing an example of the progression of the process of the program complex of the first embodiment.
Figure 6:
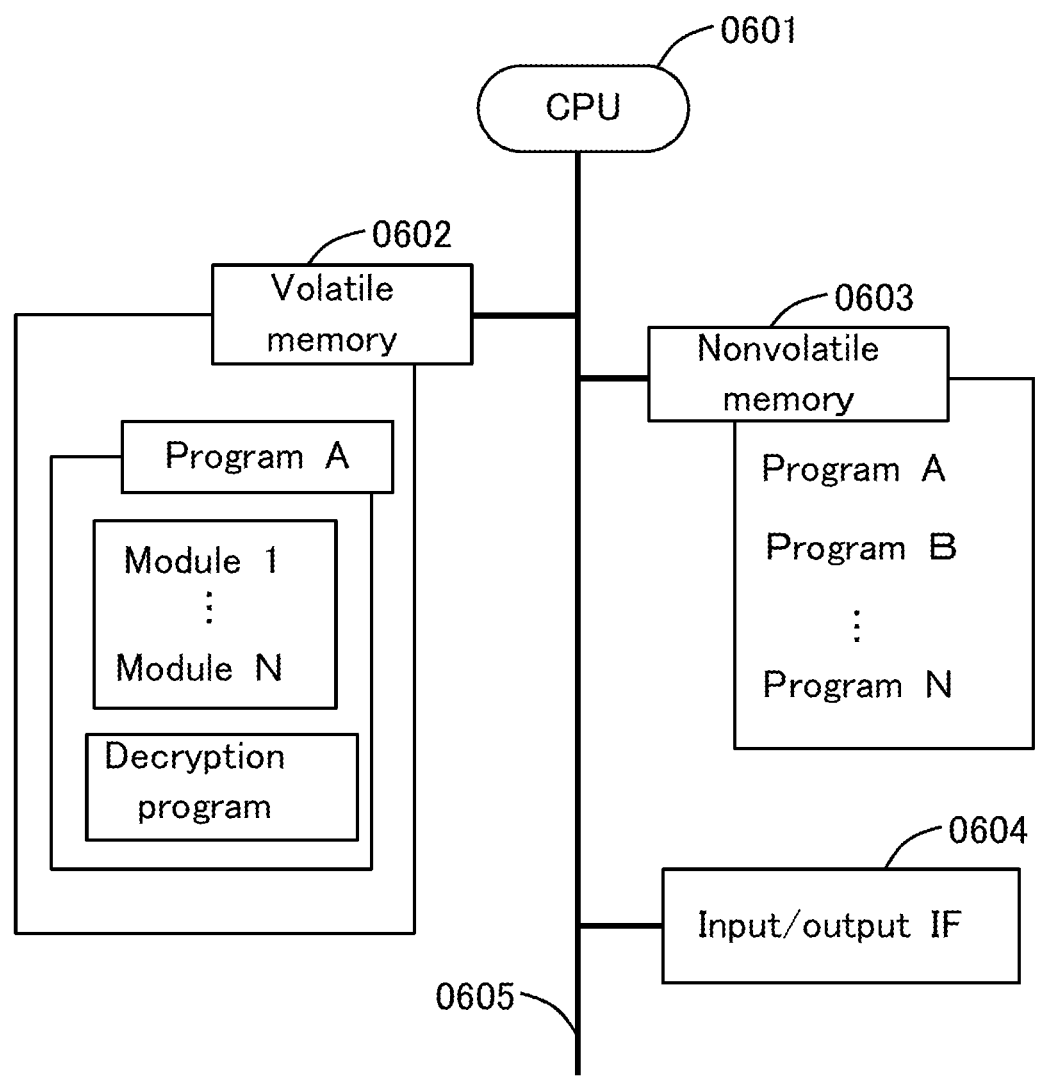
FIG. 6 is a schematic diagram showing an example of the hardware configuration of the program complex of the first embodiment.
Figure 7:
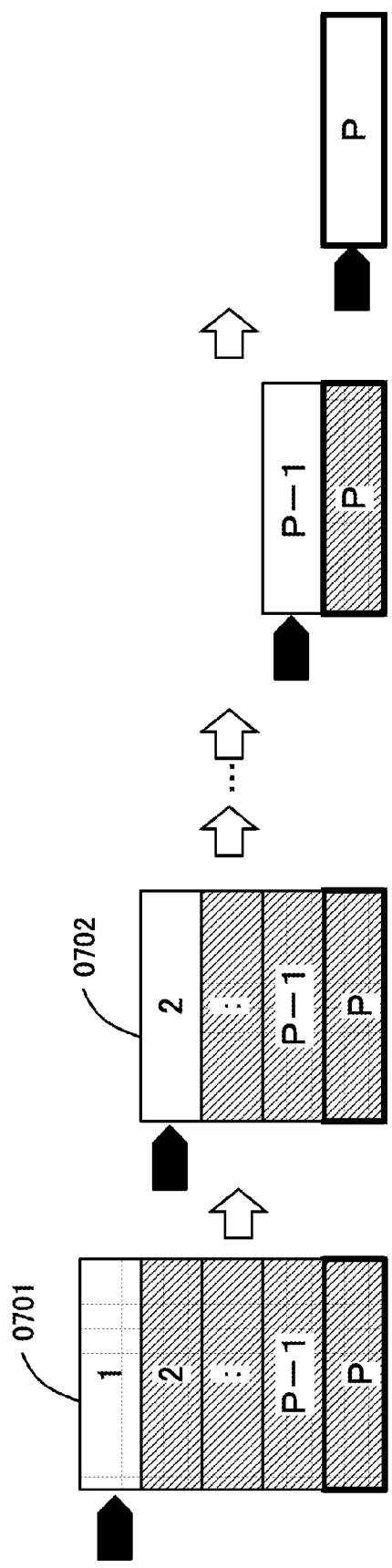
FIG. 7 is a diagram for explaining an example of processes of a program complex of a second embodiment.
Figure 8:
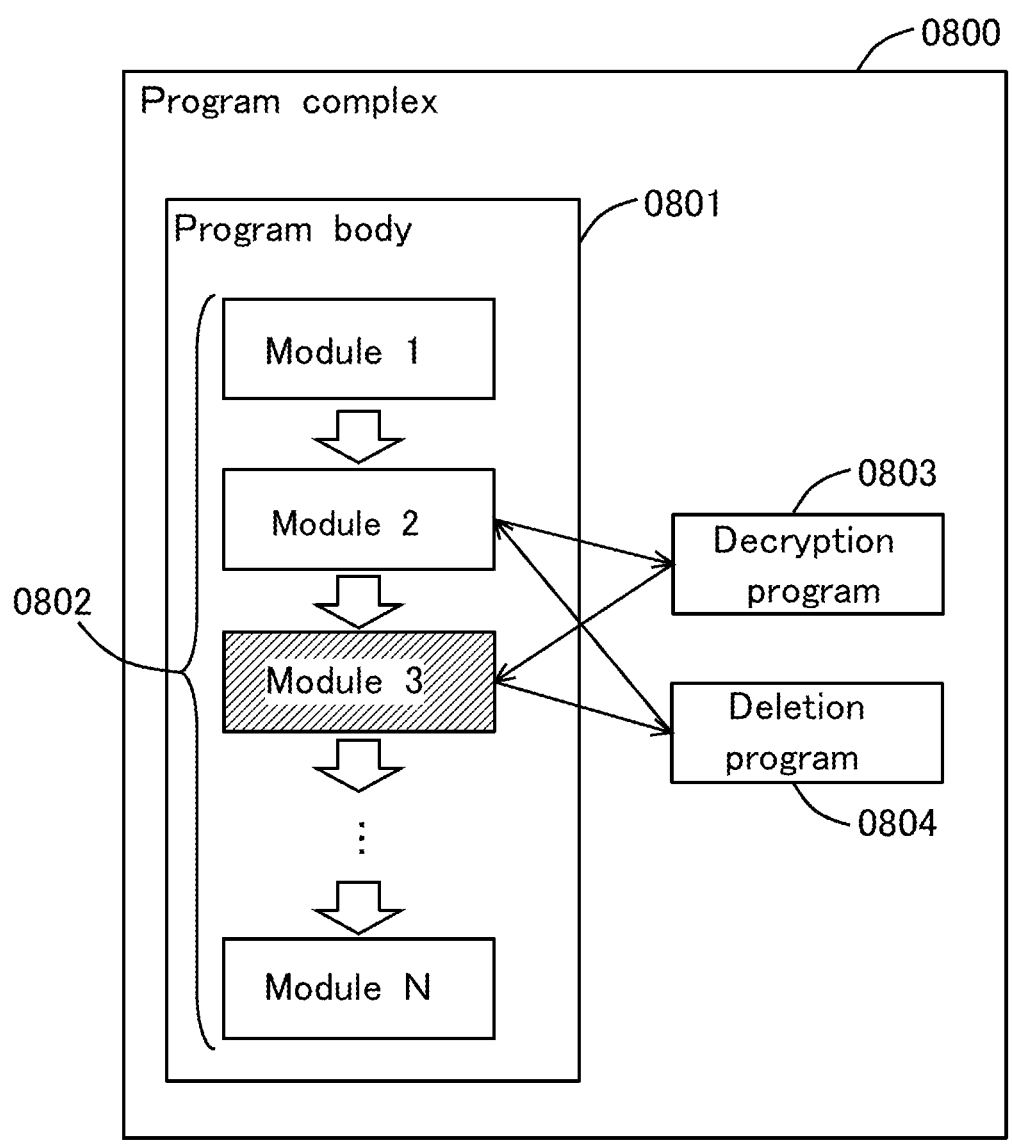
FIG. 8 is a diagram showing an example of a functional block of the program complex of the second embodiment.
Figure 9:
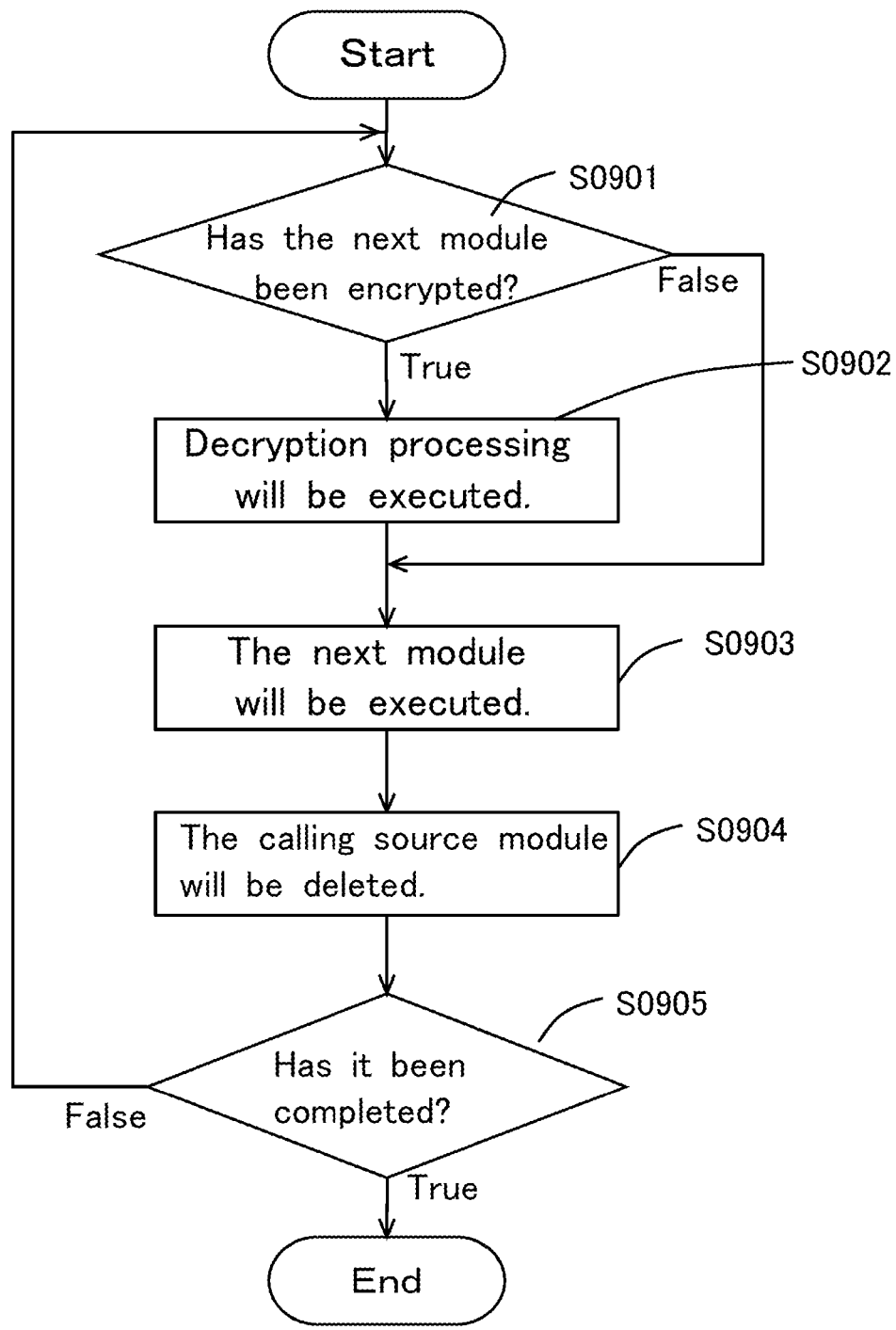
FIG. 9 is a flow chart showing an example of progression of process of the program complex of the second embodiment.
Figure 10:
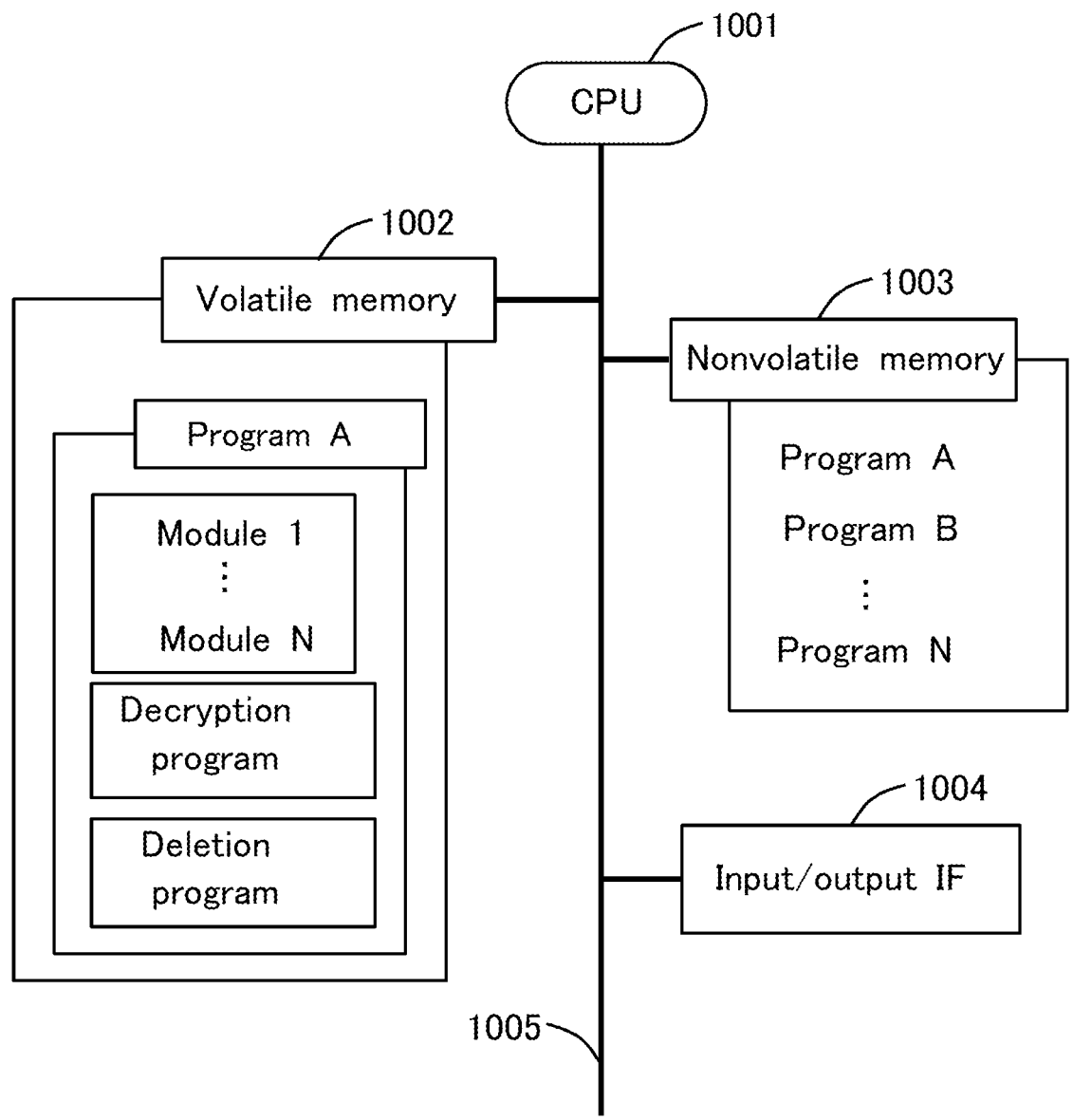
FIG. 10 is a schematic diagram showing an example of the hardware configuration of the program complex of the second embodiment.
Figure 11:
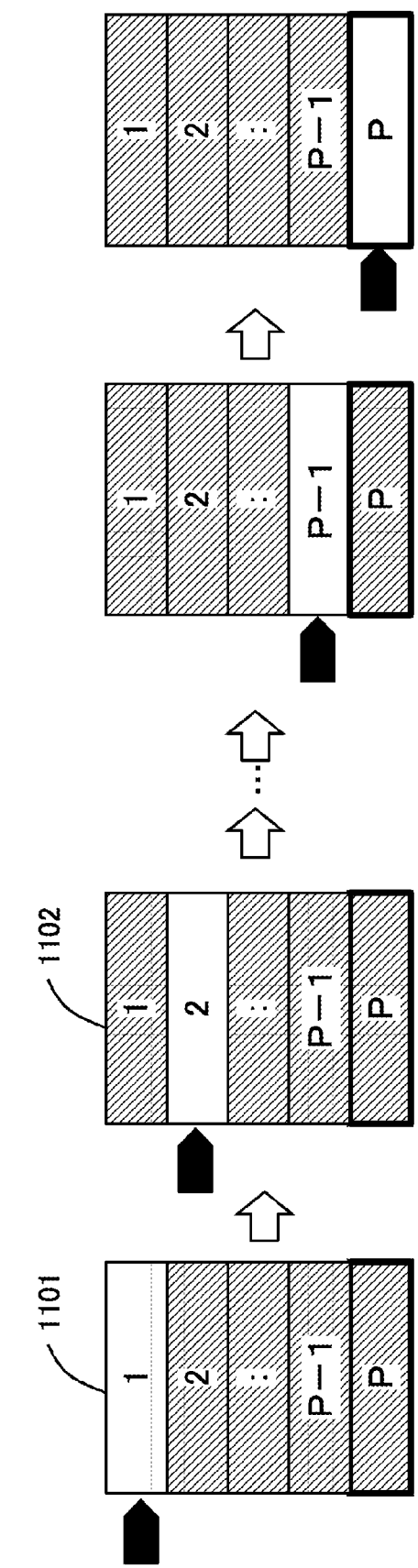
FIG. 11 is a diagram for explaining an example of processes of a program complex of a third embodiment.
Figure 12:
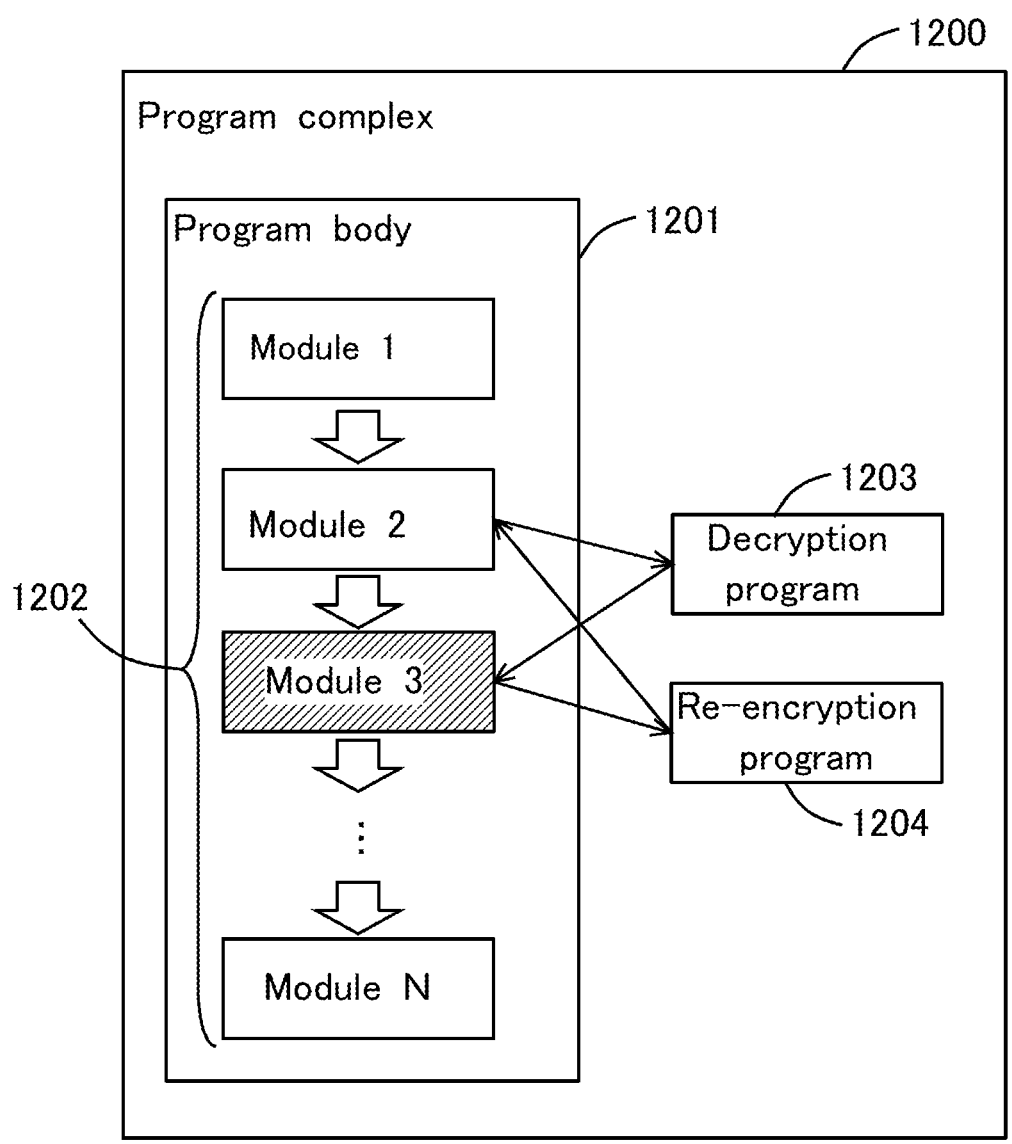
FIG. 12 is a diagram explicating an example of a functional block for the program complex of the third embodiment.
Figure 13:
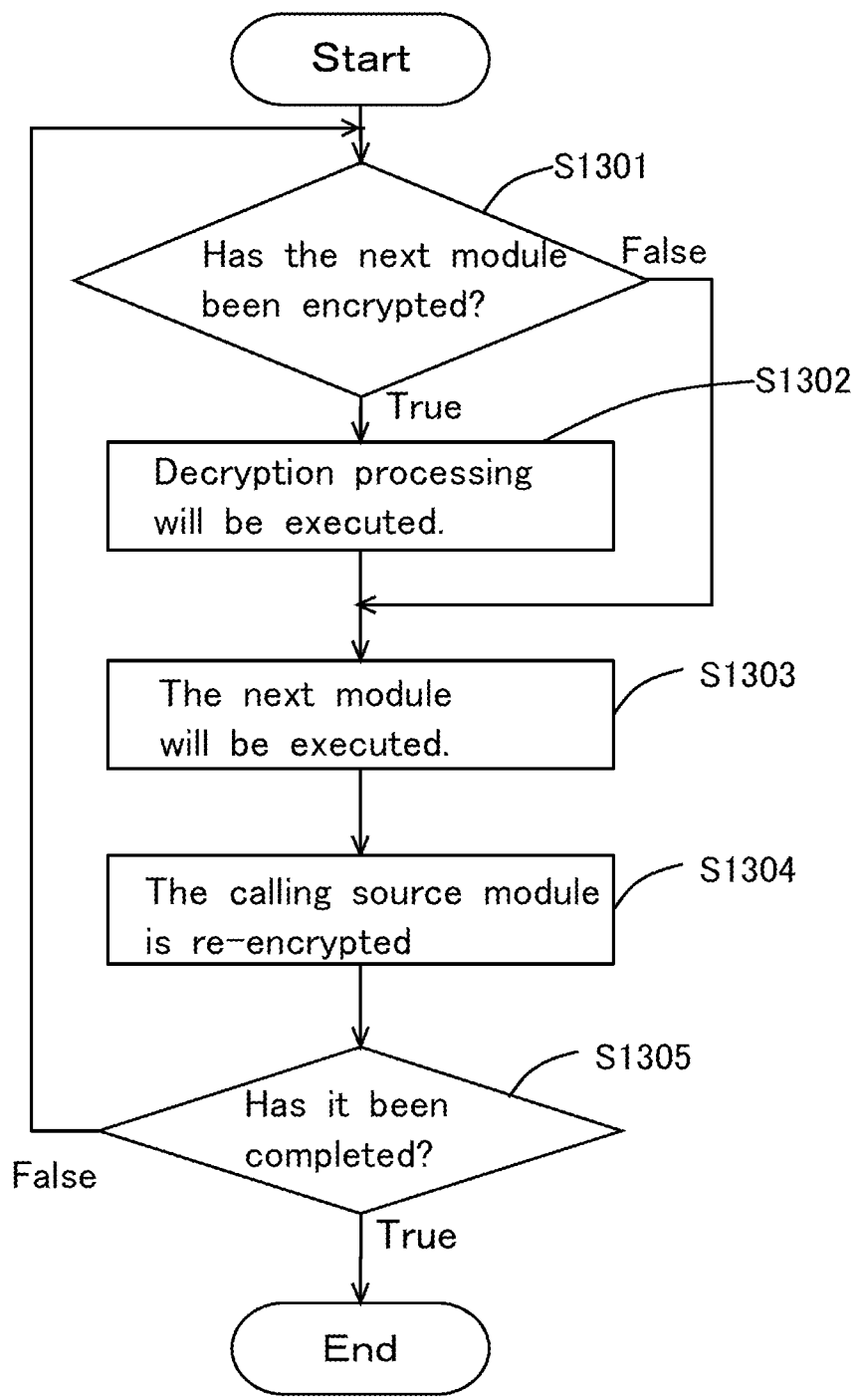
FIG. 13 is a flow chart showing an example of progression of process of the program complex of the third embodiment.
Figure 14:
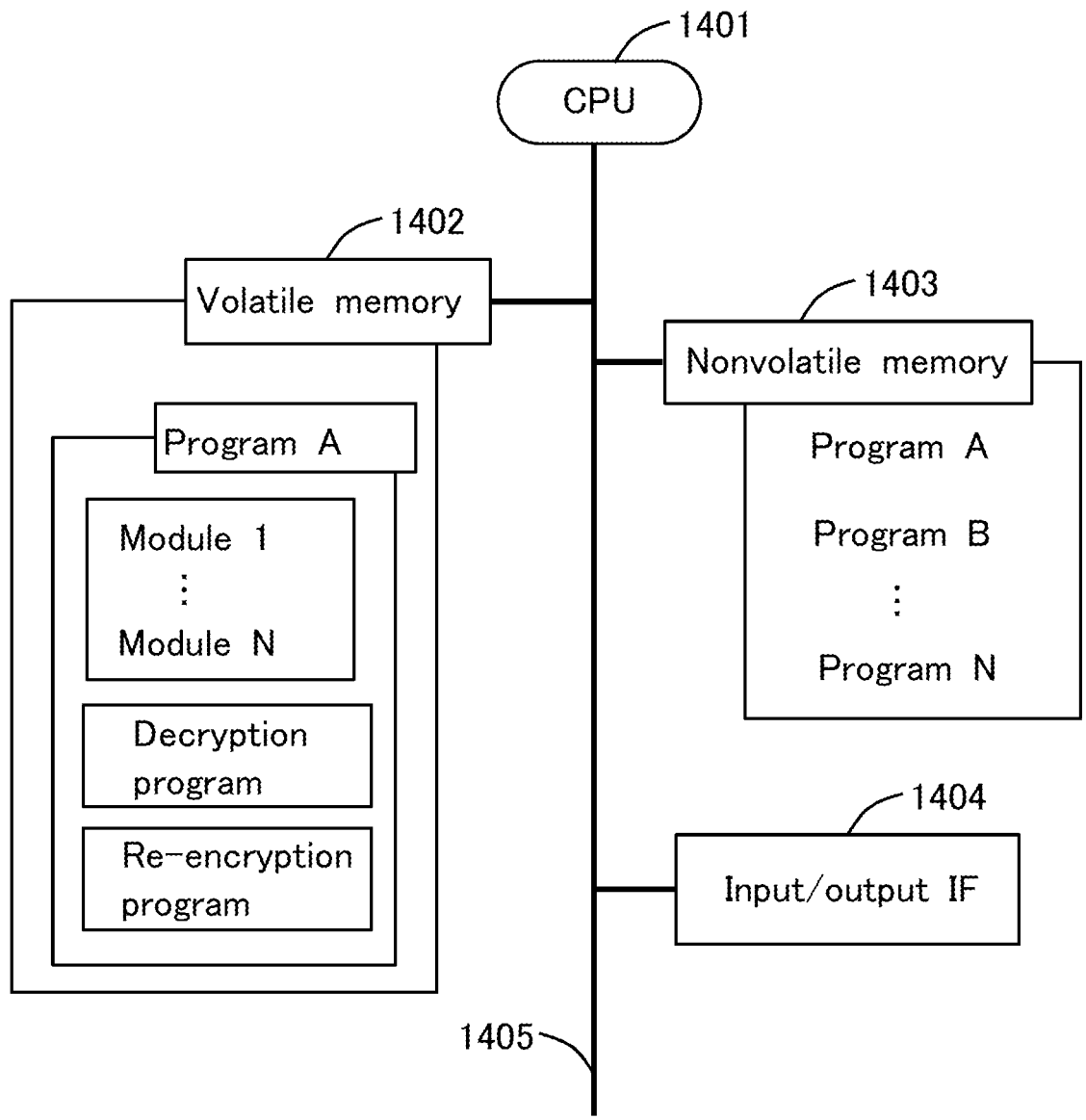
FIG. 14 is a schematic diagram showing an example of the hardware configuration of the program complex of the third embodiment.

What is claimed is:

1. A computer program complex that is configured with a plurality of modules, the computer program embodying computer readable instructions stored on a non-transitory computer readable medium for causing execution in a computer, the computer program complex comprising:
at least one module of the plurality of modules being encrypted in a non-execution state of the computer readable instructions;
instructions for executing a current-executed module; and
instructions for decrypting a next-executed module, which is encrypted and is executed after the current-executed module is executed, before the executing of the current-executed module is completed.

2. A computer decryption program product embodying computer readable instructions stored on a non-transitory computer readable medium for causing execution in a computer, the computer decryption program product comprising:
the computer program complex according to claim 1.

3. A encryption program product embodying computer readable instructions stored on a non-transitory computer readable medium for causing execution in a computer, the computer decryption program product comprising:
Instructions for encrypting the next-executed module according to claim 1.

4. The program complex according to claim 1, further comprising:
instructions for deleting a calling source module that calls the next-executed module after the next-executed module is executed from the non-transitory computer readable medium.

5. The program complex according to claim 1, further comprising:
a re-encryption program for causing a computer to re-encrypt instructions for re-encrypting a calling source module that calls the next-executed module after the next-executed module is executed.

* * * * *